Oct. 22, 1935.  G. H. TABER  2,018,425
AUTOMATICALLY CONTROLLED COASTING DEVICE FOR AUTOMOBILES OR OTHER VEHICLES
Filed Feb. 1, 1932  2 Sheets—Sheet 1

INVENTOR
George H. Taber
BY
his ATTORNEY

Oct. 22, 1935.  G. H. TABER  2,018,425
AUTOMATICALLY CONTROLLED COASTING DEVICE FOR AUTOMOBILES OR OTHER VEHICLES
Filed Feb. 1, 1932  2 Sheets-Sheet 2

Fig. 7.

INVENTOR
George H. Taber,
By
ATTORNEY

Patented Oct. 22, 1935

2,018,425

UNITED STATES PATENT OFFICE 2,018,425

AUTOMATICALLY CONTROLLED COASTING DEVICE FOR AUTOMOBILES OR OTHER VEHICLES

George H. Taber, Binghamton, N. Y.

Application February 1, 1932, Serial No. 590,289

31 Claims. (Cl. 123—124)

This invention relates to an automatically controlled coasting device for automobiles or other vehicles.

One object of the present invention is to provide means for association with an internal combustion engine of an automobile or other motor driven vehicle, adapted for automatic operation, to supply air to the motor in operation while the accelerator and carburetor throttle are in idling positions and while the gear shift of the transmission remains in gear so as to permit coasting of the vehicle and supply of the air while coasting until the device subsequently acts automatically to shut off the supply of air and permit the motor power producing mechanism to function in the usual manner.

Another object of the invention is to provide means for association with an internal combustion engine of an automobile or other motor driven vehicle for the supply of air to the motor in operation while the accelerator and carburetor throttle are in idling positions and the gear shift of the transmission remains in high gear so as to permit coasting of the vehicle and a supply of air to the motor parts while coasting and until the device subsequently acts automatically to shut off the supply of air and permit the motor power producing mechanism to function in the usual manner.

Another object of the invention resides in the provision of means for association with an internal combustion engine of an automobile or other motor driven vehicle adapted for automatic operation to render the ignition inoperative and to supply air to the motor in operation while the accelerator and carburetor throttle are in idling positions and the gear shift lever of the transmission remains in gear so as to permit coasting of the vehicle, the device subsequently operating to automatically shut off the supply of air and restore the ignition to operative condition and permit the motor power producing mechanism to function in the usual manner.

Another object of the invention resides in the provision of electrical means for association with an internal combustion engine of an automobile or other motor driven vehicle adapted for automatic operation to supply a gaseous medium as hot exhaust gases or warmed air passing from the engine through the exhaust manifold or cool air to the motor in operation while the accelerator and carburetor throttle are in idling positions and while the gear shift lever of the transmission remains in gear so as to permit coasting of the vehicle until the speed of the motor has become decreased to the extent that the generator will not charge the battery at such low speed and consequently open the electrical circuit automatically and shut off the supply of air and permit the motor power producing mechanism to function in the usual manner.

Another object of the invention is to provide electrical means for association with an internal combustion engine of an automobile or other motor vehicle adapted for operation to supply air to the motor in operation while the accelerator and carburetor throttle are in idling positions so as to permit coasting of the vehicle until the speed of the motor has become decreased to the extent that the generator will not charge the battery at such low speed and consequently open the electrical circuit automatically and shut off the supply of air and permit the motor power producing mechanism to function in the usual manner while the accelerator and carburetor throttle remain in their idling positions.

Another object of the invention resides in means associated with an internal combustion engine of an automobile or other motor driven vehicle embodying an electrical means constructed and arranged whereby when the motor reaches sufficient speed to cause the generator to charge the battery the accelerator and carburetor throttle may remain in their idling positions and the vehicle will coast until the speed of the motor decreases to a point where the generator will not charge the battery when such electrical means will actuate to cause the motor power producing means to be restored to function in the usual manner.

Another object is to provide an automatically controlled coasting device for automobiles, embodying among other characteristics, means whereby when the driver places the gear shift of the transmission in high gear there is no need for further action or consideration on the part of the driver of the vehicle with respect to the fulfillment of the automatic operation of the device.

Another object of the invention resides in the provision of an automatically controlled coasting device for automobiles or other motor driven vehicles embodying means whereby as long as the accelerator and carburetor throttle working in unison with the accelerator are in idling positions the vehicle will coast and yet the driver may use the accelerator for power producing purposes at any time desired, throwing the coasting mechanism out of operation as long as power is desired or required, and when the power is neither desired nor required he simply ceases to actuate the accelerator when the device functions again for coasting purposes, and while coasting, if the speed of the vehicle or motor decreases the device will automatically function to re-establish the power producing functions of the motor, and when increased power is required it is simply necessary to actuate the accelerator and these operations may be repeated over and over again during the operation of the vehicle.

Another object of the invention resides in the provision of means for association with the internal combustion engine of an automobile or other motor driven vehicle embodying the supply of hot gases, warmed air, or cool air, optionally, to the motor through an air intake tube having communication with a valve controlled means interposed between the internal combustion engine and the tube.

Another object of the invention is to provide an automatically controlled coasting device for automobiles including an intake air tube and an automatically controlled valve means, both coupled up with the combustion engine of the vehicle and in which the cool air drawn in to the air intake tube is muffled at the point of entry for the purpose of silencing the noise incident to the rush of air into the tube.

A still further object of the invention is to provide an automatically controlled coasting device for automobiles or other motor driven vehicles and with which means instrumentalities are employed whereby quantities of oxygen may be supplied under predetermined pressure and in predetermined quantities to the air current while the vehicle is coasting, according to requirements necessary to complete the combustion of carbon in the combustion chamber of the motor.

It is still another object of the present invention to provide an economic means or method whereby oxygen can be supplied to an air supply leading to or through an internal combustion engine of an automobile and according to which means or method a controlling valve, cooperatively associated with the motor is arranged to operate in such a manner as to preclude waste of oxygen and insure an effective mixing of the oxygen and engine carbon in state of incandescence to effectively disintegrate the carbon formations.

It is still further contemplated, in carrying out the present invention, to provide a means or method for coasting purposes in such a manner as to obviate thought or action on the part of the driver either with respect to placing the parts in operation to affect the coasting operation or as regards re-establishment of parts to automatically restore power producing energy of the motor and in which means or method there may be connected suitable instrumentalities for cooling overheated parts and for eleminating carbon formation by the introduction of oxygen while the motor is in motion, as when coasting.

With these and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

In the drawings:

Figure 7 is a diagramatic view illustrating an electrical diagram illustrating the various electrical appliances and their operative connection with relation to one another and with relation to the mechanical parts of the invention.

Referring now more particularly to the accompanying drawings, the reference character 1 indicates an automobile or other engine provided with an intake manifold 2, an exhaust manifold 3, and a carburetor 4 of any suitable variety.

A magnetically controlled valve mechanism, indicated generally, by the reference character A, is located adjacent the engine or carburetor or between the same. This control mechanism A may be of any suitable structure, but for purposes of illustration, it is shown as including a casing providing a chamber 5 in which is located an electrically operated valve control magnet B and in which chamber is slidably mounted a hollow piston-like valve 6, having its lower portion reduced in diameter, providing upper and lower areas of different diameters, the upper area being larger than the lower area and the reduced lower portion being machined to provide an annular portion 7 adapted to be seated normally on an annular seat 8 in the lower portion of the chamber 5 to normally close a passage 9 which leads from the chamber 5 into a member 10 which is hollow to provide an air passage from the chamber 5 to the motor by way of the intake manifold 2 when said valve 6 is in open position, so as to permit the flow of air through the member 10 to the intake 2 while the carburetor throttle is closed. This hollow member 10 is preferably interposed between the carburetor and intake manifold and secured by means of suitable clamping devices 11 and 12 connected by suitable bolts 13. The casing which provides the chamber 5 is sometimes herein referred to as the by-pass chamber casing since when it is open to permit the flow of a gaseous medium therethrough it allows such flow therethrough into and through an intake manifold of the engine in such a manner that the gaseous medium thus supplied through the chamber by-passes the carburetor through which a fuel and air mixture is supplied to the intake manifold except at such times when the by-pass gaseous medium is flowing to the intake manifold. The hollow piston-like valve 6 which permits or controls the flow of air through the by-pass chamber may be referred to as a differential control valve and it is sometimes herein referred to as the by-pass chamber valve.

The piston-like valve 6 has an upper portion slidably fitting the interior of the chamber 5 and carries at its lower end a stem 14, operating in a suitable guide 15, located in the hollow member 10, whereby to effectually provide for a true sliding movement of said valve and to effect a proper seating of the lower portion 7 thereof on its seat 9. This piston-like valve 6 may be inspected to determine whether it is operating effectively by opening a peep-hole cover 16 mounted at one side of the chamber 5 and held normally tightly closed by means of a screw or other suitable fastening 17.

The chamber 5 is provided with a removable cover 18 which may be fastened in position on the chamber 5 by screws or other suitable fastening devices 19. A boss 20 rises from the cover 18 and in this boss 20 are formed cylindrical, parallel valve casings 21 and 22. A needle valve 23 rectangular in cross section, is slidably mounted in the valve casing 21 to normally close a port 24 leading into a nipple 25. A pipe or by-pass 26 is secured by screw threaded or other connection with the nipple 25 and communicates with the aforesaid hollow passage member 10. The needle valve normally prevents communication between the interior of chamber 5 and the interior of the hollow passage member 10, a vacuum being maintained on the under side of the valve 6 when the motor is producing power. When coasting, the upper, larger side of the valve 6 is exposed to partial vacuum by reason of the communicating pipe or by-pass 26 between the chamber 5 and the hollow passage member 10.

A hollow open ended vent valve 27 is coupled with the needle valve 23, preferably by means of a suitable carrier pin 28, so as to provide for movement of the valves 23 and 27 in unison. The hollow vent valve 27 has an opening 29 which normally registers with a vent opening 30 leading from the valve casing 22 to the atmosphere. When the needle valve 23 is closed the vent valve 27 has its opening 29 in registration with the opening 30 of the valve casing 22 to permit ingress of air into the chamber 5 through the hollow valve 27, so that the piston-like valve 6 may return to its normal positon on its seat after it has been lifted from its seat in a manner to be hereinafter described.

When the piston-like valve is on its seat, the smaller area portion at the under side of the valve is exposed to the vacuum which is confined to the intake manifold and passage 10 incident to degree of carburetor throttle opening, because of the by-pass 26 to the chamber 5 being closed by said needle valve 23. When the needle valve moves from its seat, establishing communication between the passage 10 and chamber 5, and the vent opening 29 closed, a partial vacuum is created in chamber 5, exposing the upper larger area of the piston-like valve 6 to a partial vacuum to lift the valve 6 from its seat, the magnet B in the chamber 5, when energized, assisting the partial vacuum to hold the valve 5 away from its seat.

An air inlet tube 31 is mounted adjacent the chamber 5 and in one aspect of the present invention this air inlet tube 31, together with the chamber 5 and the hollow passage member 10 may be cast or otherwise formed as a unitary device. This air inlet passage 31 communicates at its lower end with the exhaust manifold 3 of the motor, through the instrumentality of an interposed coupling 32. For instance, the air inlet tube 31 has a flange 33 at its lower end and the coupling 32 has a flange 34 at its upper end. Bolts connect these flanges together to provide a tight joint between the air tube 31 and the coupling 32 and the coupling 32 may be secured to the exhaust manifold in any suitable manner. The air inlet tube 31 has communication with the chamber 5 through a passage 36 and also with the aforesaid hollow passage member 10 when the valve 6 is unseated.

The air inlet tube 31 is designed to perform a dual function, as will be apparent hereinafter, and it is provided at its upper end with a muffling hood 37. This hood is of cup shape and telescopes with the upper end of the inlet tube 31 in spaced relation to the latter and may be secured to the air inlet tube 31 by means of suitable fastenings 38. As illustrated, said hood 37 has its side walls surrounding the upper end of the air inlet tube 31 and is spaced slightly from the outer walls of the air inlet tube 31 so as to permit the passage of cold air between the air inlet tube 31 and the hood. This cold air is drawn into the air inlet tube 31 by the suction of the motor and is drawn from the atmosphere downwardly into the air inlet tube 31 beyond the upper open butterfly valve 39 to the aforesaid passage 36 and through the passage member 10 to the inlet manifold of the motor when the piston-like valve 6 is open.

A lower butterfly valve 40 is swingingly mounted within the air inlet tube 31 and is connected with the upper butterfly valve 39 by means of valve operating crank arms 41 and 42, respectively, and a connecting rod 43, so that these valves may operate conjointly and open and close alternately. This operation of the butterfly valves 39 and 40 may be effected through the instrumentality of suitable operating means arranged on the dashboard (not shown) or otherwise within the reach of the driver of the vehicle, as for instance, by means of a rod or other suitable connection 44 connected to a crank arm 45 on the pivot of the lower butterfly valve 40. By operating the rod 44 we may open the lower butterfly valve 40 and close the upper butterfly valve 39 or we may open the upper butterfly valve 39 and close the lower butterfly valve 40. When the upper valve 39 is closed and the lower valve 40 is open, through operation of said control rod 44, the cold air is not drawn into the air inlet tube 31 from the upper end thereof to passage 36 or to the hollow member 10, but when the upper butterfly valve 39 is closed and the lower butterfly valve 40 is open the warm products of combustion are then drawn from the exhaust manifold into the lower end of the air inlet tube 31 and through passage 36 and through the hollow member 10 and through intake manifold 2 to the motor, circulating over such course while the vehicle is moving under its own momentum. When the lower butterfly valve 40 is closed and the upper butterfly valve 39 is open and the cool air is drawn past the open piston-like valve 6 into and through the motor the overheated motor parts and carbon are cooled to render the motor more efficient, reducing knocking incident to overheated parts.

An accelerator pedal is indicated at 47 and includes an arm 48, pivoted at 49, to a suitable bracket 50, secured in any suitable manner to the floor 51 of the vehicle.

The carburetor throttle 52 has a pivot 53 which projects through the carburetor casing in the usual manner and to this pivot is rigidly secured a crank arm 54.

A connection is made between the arm 48 of the accelerator and the crank arm 54 of the carburetor throttle 52. This connection may be of any suitable character but, as shown for purposes of illustration, consists of a suitable rod 55 having one end directed laterally, as at 56, through an eye 57 in the crank arm 54 and provided with a perforation to receive a fastening pin 58. The opposite end of the connecting rod 55 is pivotally connected to the accelerator arm 48. Thus, as the accelerator is swung forwardly on its pivot 49, as by pressure thereon of the driver's foot, the connection 55 opens the carburetor throttle for the usual driving purposes. The carburetor throttle is maintained closed or in idling position for the carburetor by a spring 61 except when the accelerator is pushed forwardly by the operator of the vehicle. The spring 61 is connected to a lug 62, on the pivot 49, and to a suitable device 63 adjustably mounted on an exteriorly screw threaded sleeve 64 fixed on the rod 55 and having nuts 65 and 66 working on the threaded sleeve 64 on the opposite sides of the device 63 to provide for an adjustment of the device 63, as will be understood. At this point it is desired to state that the accelerator and its mounting and the particular connection with the carburetor throttle is disclosed merely for purposes of illustration and that any suitable accelerating means and connection therebetween and the carburetor throttle may be employed.

At the time of opening the carburetor throttle 52 by means of the rod 55, a grounding arm 67, pivoted at 68, on the air inlet tube 31 is actuated to cause its contact 69 to engage the terminal 70 mounted on the air inlet tube 31, and insulated therefrom. The contacts 69 and terminals 70 may be considered as contacts of what may be termed a grounding switch and which switch is sometimes herein referred to as an accelerator controlled or accelerator positioned switch. This grounding arm has its contact 69 normally spaced from the terminal 70 by reason of a spring 71 against the pressure of which the grounding arm is actuated to make the contact with the terminal 70. The separation of the contact 69 from the terminal 70 by reason of pivotal movement of the grounding arm on its pivot 68 is limited by a stop 72 engaging the outer surface of the air inlet tube 31. When the accelerator and carburetor throttle are permitted to return to idling position a chain or other suitable connection 73, connected with the lug 73' and the device 63, causes the ground arm 67 to make the contact with the terminal 70 under the influence of the aforesaid tension spring 61, which is stronger than the compression spring 71. In short when the accelerator and carburetor are in idling position the grounding or accelerator controlled switch is closed.

It is essential that the closing of the carburetor throttle and the making of the contact between the contact element 69 and terminal 70 be simultaneous. In other words, the making and breaking of the magnetic circuit hereinafter explained, to wit, the making and breaking of the circuit that includes the magnet B should coincide with the opening and closing of the throttle valve when coasting is desired. To provide for any variation from this simultaneous action, as regards effecting closing or idling position of the carburetor throttle and the making of the said electric contact 69—70, I provide an adjusting means in the nature of the aforesaid device 63 which may be moved in either required direction on the sleeve 64 and maintained in an adjusted position by means of the nuts 66.

The closing of the grounding switch, viz, the making of said contact 69—70 between the ground arm 67 and the pivot 68, which is in fact grounded on and through the air inlet tube 31, is for the purpose of closing a portion of an electrical circuit designed to energize the aforesaid magnet B. It will be noted that the contact 70 of the grounding switch is carried by but is insulated from the air inlet tube 31 and that this contact 70 is connected by wires 72' to the terminal connection 76 of magnet B. This magnet B is supported by a suitable bracket of non-magnetic metal 74, secured to the under side of the cover 18 of the chamber 5, and suspended from the said cover within said chamber 5 and secured in one way by means of suitable fastenings 75. One end of the magnet winding is connected to a terminal 76, which as above indicated in turn is electrically connected with the aforesaid terminal 70 by a wire 72', the other end of said magnet winding being electrically connected to a terminal 77 which terminal is electrically connected by a wire 77' with wire 78 to a terminal 79 to which an electrical switch 80 of common construction is electrically connected. The switch 80 may be and is referred to sometimes as the gear shift controlled switch and sometimes as the transmission gear controlled switch.

When the gear shift transmission lever 81 is in high gear, a switch button 82 of the switch 80 is compressed by the gear shipper rod 83 and thereby connect the circuit through switch 80 with the terminal 84 of switch 80, thus closing another opening in said circuit. This switch 80, as shown in Fig. 7, includes a contact bar A' carried by the slidable switch button 82 which latter is compressed against the action of the spring C' by the shipper rod 83, upon operation of the gear shifting lever 81, into coactive engagement with the terminals 79 and 84. The bar A' is insulated from the bar 82 and the spring C' by insulation B' and B² and the key D' permits slidable movement of the button 82 but prevents rotation thereof so as to thereby insure effective alignment of the contact bar A' with the terminals 79 and 84, as will be understood. A wire 85 leading from terminal 84 is electrically connected to an electrical contact 86 which remains open with relation to a contact 87, so long as the speed of the motor is insufficient to cause the generator C to charge the battery 88, shown in the electrical diagram. When the speed of the motor becomes sufficient to charge the battery 88, an automatic cutout device, consisting of contacts 89 and 90, closes so that the generator current will charge the battery 88 as in common practice. The contacts 86 and 87 may be referred to as magnet circuit auxiliary contacts of a generator controlled switch, to wit, of a switch that is operatively associated with the generator in a manner to function as above outlined. The contacts 86 and 87 of the automatic cut out or automatic cut out switch may be considered as a set of contacts of a generator controlled switch. The automatic cut out device as is well known functions to cut out the electric connections between the generator and battery of the ignition system when the speed of the generator drops so that the generator no longer charges the battery. The generator controlled switch that includes the contacts 86 and 87 may also be referred to as a speed controlled switch because the functioning thereof for closed position depends upon the speed of some member being sufficiently great and because for the opening of said switch it is dependent upon the speed of that same member dropping sufficiently or to a predetermined set condition. The speed of the member that controls the opening and closing of this switch may be that of a part either driven or propelled directly or indirectly from and by motor. It will therefore be seen that the switch which comprehends the contacts 86 and 87 may consequently properly be referred to as the magnet circuit auxiliary speed controlled switch. In connection with contact 89 of the cut out switch, I employ the supplemental spring-like member 91 which causes contact 87 of the magnet-circuit auxiliary switch to move coincident with contact member 89, thereby closing the magnet circuit auxiliary switch contacts 86 and 87, and thus closing the circuit between the same and the switch 80 through the wire 85. For the purpose of the present invention the contact 87 may be considered as directly or indirectly supplied with energy from the generator C—to wit, as at the energy supply end of the operating circuit for the magnet B—and the operating circuit for the magnet B is maintained completed only so long as the contacts 86 and 87 are closed, assuming other circuit switches are closed, that is during the idling period previously mentioned herein and as to that only for such time as when the generator is operating at sufficient speed to charge the battery of the electrical ignition system. The contact 86 and also contact 90 is insulated from the conventional parts of the usual automatic cut-out of the generator. The operation previously described automatically closes and opens the circuit which causes a magnetic operation for energizing and de-energizing the magnet B for controlling the valves of the magnetic control mechanism.

From the foregoing it will be seen that if the speed of the motor drops below a charging rate, that the contacts between parts 86 and 87 will open, thus deenergizing magnet B and thereby indirectly allowing valve 6 to return to seated position, which will prevent functioning of the coasting device so that the motor will again function as a power producing means. It will also be noted that if the gear operating lever 81 is not in high gear that the coasting function will not be obtained. If the contact between the grounding arm 67 and the contact 70 is open, the motor or vehicle will not coast. When magnet B is energized by closing the grounding switch that includes contacts 69 and 70 the circuit is as follows, energy directly or indirectly supplied from the generator passes through the closed magnetic circuit auxiliary switch that comprises contacts 87 and 86, wire 85, terminal 84 of switch 80, the transmission gear controlled switch 80, terminals 79 of said switch 80, wires 78, wires 77', terminals 77 for magnet B, the coil of magnet B, the terminals 76 for magnet B, wires 72', and 122, closed contacts 70 and 69 of the grounding switch, thereby directly or indirectly completing the circuit which is supplied directly or indirectly through or by generator C.

The magnet operating circuit described above is for the purpose when closed, of energizing the magnet B and thereby attracting the previously mentioned needle valve 23 and the vent valve 27.

Figures 1, 2, 3, 4, 5, 6:
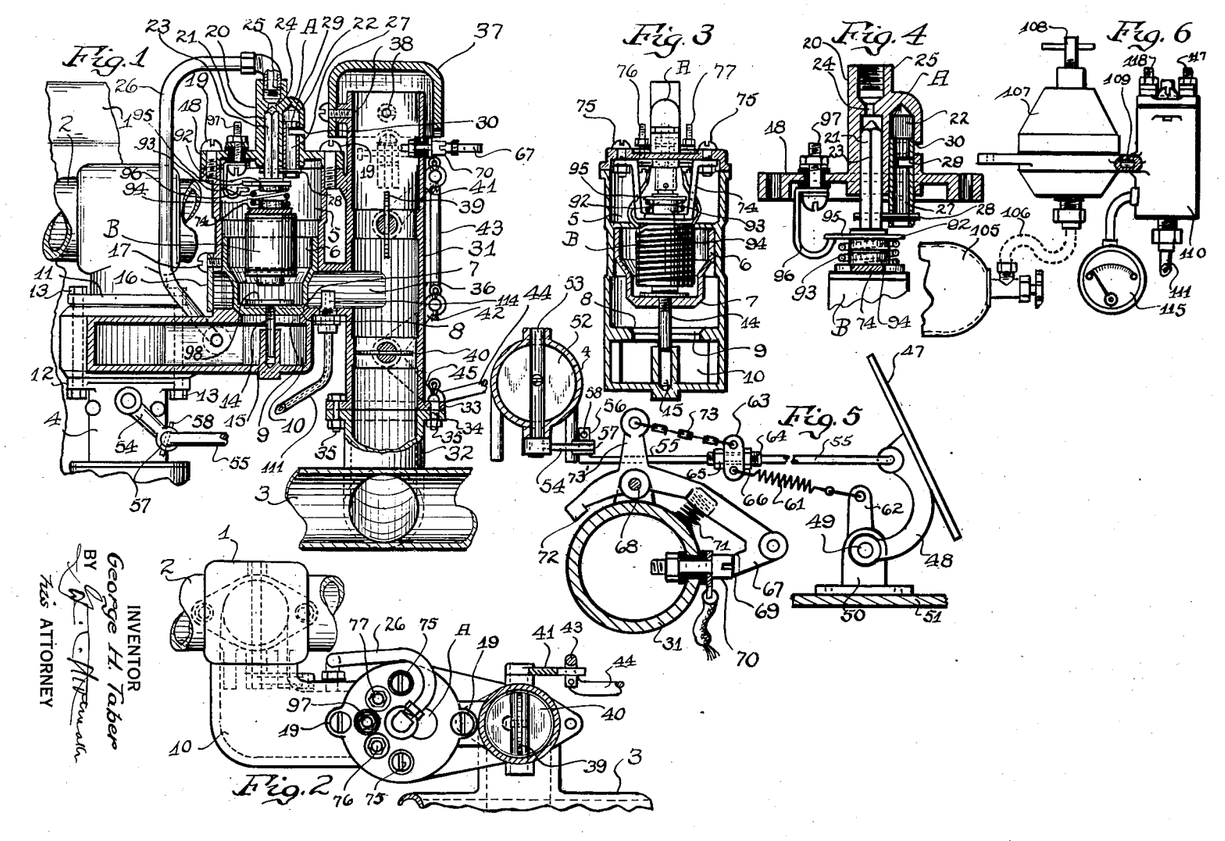
Figure 1 is a view partly in elevation and partly in vertical section illustrating the invention mounted with relation to the intake manifold of an automobile engine or motor, showing the valve control mechanism parts in their respective positions prior to the coasting operation.
Figure 2 is a top plan view, partly in section.
Figure 3 is a vertical sectional view of the magnet valve controlled chamber, taken on a line at substantially right angles to the vertical section shown in Figure 1, to illustrate the hanger for the magnet and showing the piston-like valve elevated from its seat.
Figure 4 is an enlarged detail view partly in elevation and partly in section, illustrating the cover for the valve control chamber and showing the position of the needle valve and the vent valve in the positions assumed by them when the motor or vehicle is performing coasting functions.
Figure 5 is a horizontal sectional view through the air intake tube showing diagrammatically the accelerator and the carburetor throttle and the intermediate connections between the accelerator and the carburetor throttle whereby to actuate the carburetor throttle and accelerator in unison and whereby to effect other operations of the invention.
Figure 6 is an elevation partly in section illustrating a portion of an oxygen tank and a magnet control needle valve and an interposed adjustable reducing valve together with a gauge.
Figure 2:
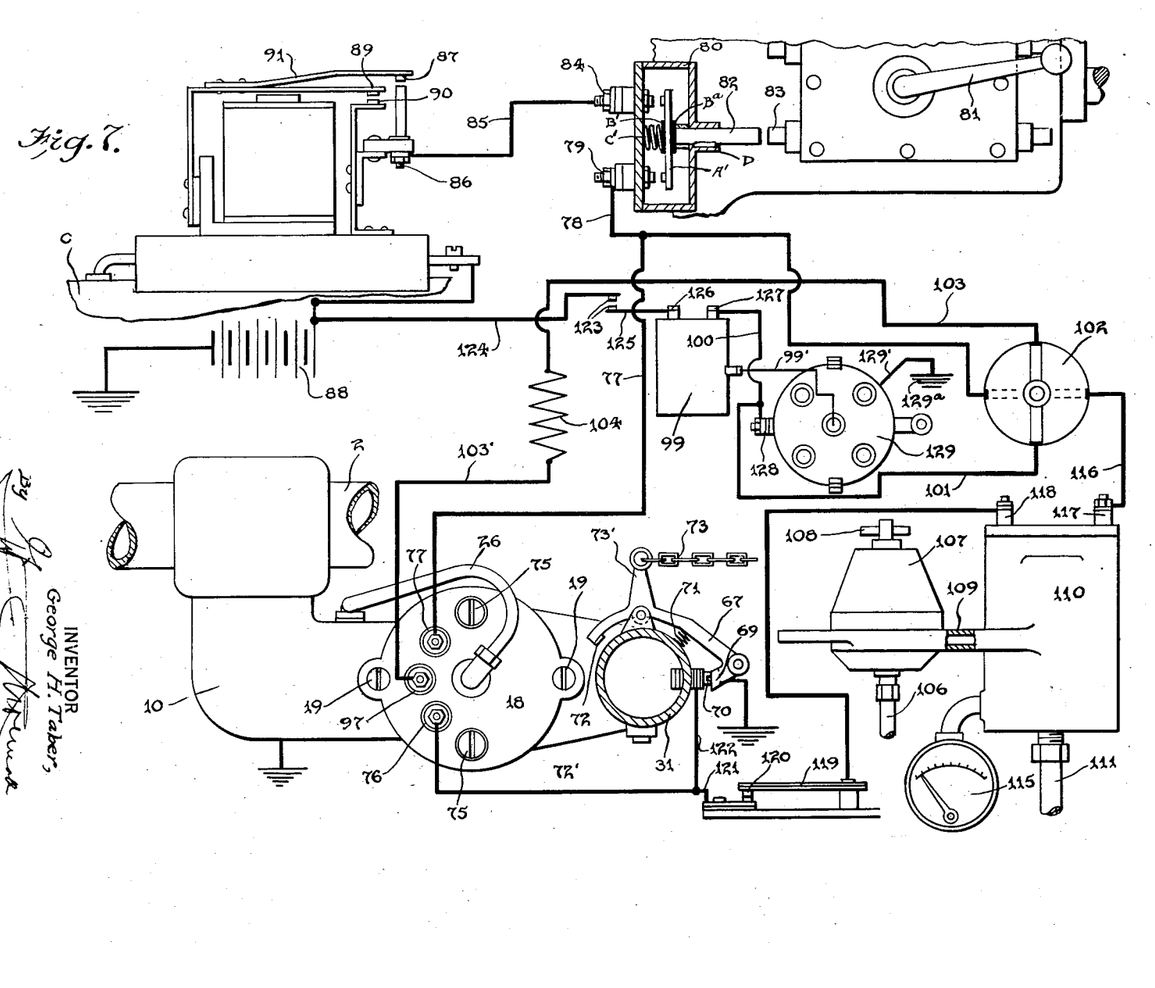

The needle valve 25 being of non-magnetic metal, carries on its lower end a soft steel disk armature 92, the needle and the armature being held upward to hold the needle valve on its seat through the instrumentality of a compression spring 93 which engages the armature 92 and embraces the pole 94 of the magnet B. When the magnet circuit has been completely closed, the magnet B becomes energized and pulls upon, viz, downwardly the armature 92 compressing the spring 93 and withdrawing the needle valve from its seat and also drawing the vent valve downwardly to close the vent opening 30. In Figure 1 the needle and vent valves are shown in their normal positions, that is, when the motor is producing power. By referring to Figure 4 the position of the needle and vent valves will be seen when they are moved away from their normal positions by the magnet B when it is desired to coast.

When it is desired to coast, viz, idle the carburetor and when the needle and vent valves are operating under the influence of the energized magnet in the manner stated above it is also advisable to ground the ignition, and this is accomplished in various ways, but as shown in the drawings, a contact plate 95, carried by the needle valve at the lower end thereof, moves into electrical contact with a spring or other yieldable contact 96, secured to the terminal 97, which is insulated from the cover 18, as shown. The needle valve in effect provides a grounded member through which the electrical current flows when the plate 95 engages the yieldable contact 96. When the plate 95 and contact 96 come together the ignition system is rendered inoperative, as will be explained more in detail hereinafter. Thus, there is a triple operation performed by the magnet B when it is energized, as for instance, the needle valve is moved from its seat, the vent valve 27 closes the vent opening 30 to the atmosphere and the ignition is grounded and rendered inoperative. When the vent opening 30 is closed and the needle valve moved from its seat, opening the port 24 leading to the nipple, and the ignition rendered inoperative, the partial vacuum from the hollow member 10 is admitted by way of the pipe 26 to the chamber 5 exposing itself to the larger diameter of the piston-like valve 6, causing the valve to lift, due to said partial vacuum thus admitted to the chamber 5. The reason for this lift is due to the fact that the area in the upper portion of the valve is larger than the lower portion. When these operations take place and the butterfly valve 39 is open and the butterfly valve 40 is closed, the suction of the motor causes air to be drawn through the air tube 31 under the muffling hood 37 down through the air tube 31 into the passage 36 and through the opening 8 past the valve seat 9 into the hollow passage member 10 and thence into the manifold intake to the motor, thus admitting cool air to the motor during the coasting operation. As the vacuum in the chamber 5 lifts the piston-like valve off of its seat upwardly toward the lower pole of the magnet B into contact therewith the energized magnet assists to hold the valve elevated off of its seat and this may be ascribed as a fourth function of the energized magnet. A cushioning device 98 carried by the piston-like valve 6 is adapted to cushion the contacting action of the valve with the lower pole of the magnet.

Should the driver actuate the accelerator or otherwise open up the electrical circuit at any point or should the generator cease to charge the battery 88, or should any opening whatever occur in the circuit, the magnet B becomes de-energized, with the result that the spring 93 immediately forces the needle valve to its seat, closing the port 24 and opening the vent 30 and re-establishing the ignition incident to separation of the plate 95 and the spring terminal 96 and permitting the ingress of air into the chamber 5 through the registering openings 29 and 30 of the vent valve and its casing and a consequent re-seating of the piston-like valve 6 on its seat 9. The re-seating of the piston-like valve 6 is brought about by the closing of the needle valve and the admission of air through the vent valve, plus the weight of the valve assisted by the suction on the lower portion of the valve as we find it in the hollow member 10.

It is desired to conserve electrical energy, especially when the ignition is grounded or rendered inoperative, as hereinbefore stated, and with this thought in mind, it will be seen by reference to the electrical diagram that the grounding circuit is taken from the outlet of the ignition coil 99 by way of a wire 100 through 101 to and through a two way switch 102 to and through a wire 103 to an economy resistance winding 104 to the terminal 97 on the cover 18 of the chamber 5.

The reason for the two way switch 102 is to enable an operator to convert the circuit for the coasting operation purposes into a circuit for use in a carbon burning operation in the use of the motor. For instance, oxygen or other carbon disintegrating medium may be stored in a tank 105 of any suitable character, carried in any suitable manner by the vehicle, or this tank may be located at a service station. In any event, the tank 105 containing the oxygen or other medium is adapted to be connected by a flexible or other connection 106 to a reducing valve 107 having means 108 for regulating the amount of pressure, said reducing valve 107 being connected by passage 109 to chamber 110 having a magnetically controlled needle valve (not shown). This chamber 110 and the needle valve is of a common structure and does not need to be illustrated in detail.

The chamber 110 has an outlet 111 which is connected with a jet 114 projecting into the passage 36 as shown particularly in Figure 1. A gauge 115 has communication with the chamber 110 and is graduated with the usual needle indicating the amount of pressure of the oxygen within the chamber 110. This oxygen or other medium is supplied to the motor during the coasting operation and is controlled or supplied by the driver, who manipulates the two way switch in a manner previously explained. In other words, the switch 102 is thrown to the dotted line position shown in the electrical diagram and closes a circuit from wire 78 through wire 116 through one of the terminals 117 of the magnetically controlled valve for controlling the flow of oxygen from the reducing valve 107, and out through the terminal 118 to a timing element 119 designed to operate to conserve and determine the amount of the oxygen or other disintegrating medium. This timing element 119 is composed of laminated members of two metals having different co-efficient of expansion for the purpose of breaking the contact at 120, to arrest the flow of oxygen after an interval of time. A wire 121 leads from the point 120 to and through wire 122 to the aforesaid terminal 70. The carbon burning operation coincides with the coasting operation, it being seen that the grounding arm 67 performs a dual function for the purpose of coasting and for burning the carbon or in other words, it is in the two circuits.

With further reference to the two way switch 102, it is found not desirable to cause the ignition to become inoperative while performing the carbon burning operation because the idea is to keep the carbon incandescent so that the oxygen will be exposed to the incandescent carbon before the carbon is cooled off. Referring to switch 102 in the dotted line position shown in the diagram, it will be noted that the grounding circuit from the ignition system is now open and therefore does not effect the ignition. By further reference to the electrical diagram the common contacts of the common ignition switch will be seen at 123. It will be noted that the current flowing from the battery 88 will be connected with the contacts 123 by wire 124 of the battery, and by way of a wire 125 to the outlet side of the coil 99 as indicated at 126. After energizing the coil 99 the current passes out of terminal 127 to the distributor breaker arm terminal 128. This is a common type of breaker arm terminal on an ordinary type of distributor 129 grounded through wire 129' and 129ª and connected to the coil 99 through wire 99'. Between the terminal 127 and the terminal 128 the current flows through wire 100, and when switch 102 is in its normal or full line position the current can branch from wire 100 and pass over wire 101 to switch 102 through wire 103 and resistance 104 and by wire 103' to the grounding terminal 97 but only at such times as when terminal 97 is grounded through the spring contact 96 because of engagement therewith by contact plate 95.

In further reference to the carbon burning process it is desirable to use no more oxygen or other carbon disintegrating medium than is required. A great saving results by closing the upper butterfly valve 39 and simultaneously opening the lower valve 40, for in this way the mixture of oxygen and air is caused to circulate continuously through the intake manifold combustion chamber and exhaust pipe, and due to the abrupt degree of the coupling 32, in its relation to the exhaust pipe 3, the particles of loosened carbon, being under a high speed of movement toward the muffler (not shown) of the exhaust pipe, the inertia of said particles of carbon carries said particles past the opening at the coupling 32 with the exhaust pipe. Thus, at this point a carbon discharging or separation takes place, due to the speed of the carbon particles following a straight plane of movement, while it is possible for the lighter mixture of oxygen and air to suddenly make its turn into the coupling 32 of the exhaust pipe 3 leading from the exhaust valves (not shown) of the lower valve 40 and through passage 36 past valve seat 9 into the hollow passage member 10 back to the intake manifold. This cycle of air is continuous so long as the carburetor throttle and accelerator are in their idling positions and should the speed of the engine or vehicle be reduced to a degree that the generator ceases to charge the battery, in such an event, the carbon burning function is automatically eliminated and the engine again starts to produce power. If the accelerator is shifted from idling position the same result follows as in the case of said reduced speed of the engine or vehicle.

It will be understood that the valve seat 9 is preferably as large or larger than the carburetor throttle opening so as to provide for a free inrush of air to the intake manifold when the automatically operating valve 6 is unseated automatically in the manner hereinbefore described, so as to prevent unnecessary resistance through the valve seat of the valve 6 to increase the coasting distance of the vehicle because of the elimination of the possibility of the motor pulling a vacuum while the valve is unseated.

It will also be understood that the automatically operating valves of the chamber 5 may be operated without necessarily rendering the ignition system inoperative. For instance, it is preferable that the ignition system be not rendered inoperative when burning out carbon. For coasting purposes it is preferable that the ignition system be rendered inoperative so that a momentary speeding of the motor will not result due to the sudden admission of the "tail end" of the fuel with the full volume of the air entering the coaster valve port.

It will also be understood that when burning out carbon the two way switch hereinbefore described, is operated to assume the dotted line position for the purpose of supplying oxygen or other carbon burning medium and in such operation the ignition system is not rendered inoperative. When the switch is turned the other way, that is, as shown in full lines in the drawings, the carbon removing medium or the circuit which controls the supply of such means is eliminated. When the switch is disposed, as shown in full lines in the drawings, the ignition system is rendered inoperative and the air only is passed through the combustion chamber of the engine.

It will also be understood that an essential feature of the present invention goes to the means associated with the internal combustion engine of an automobile or other motor vehicle in which provision is made for the supply of air, without any fuel, to the combustion chamber of the engine, to wit, of by-passed air or other hot gaseous medium, as hot exhaust gases, or warmed air supplied through and from the exhaust manifold and in a manner so as to by-pass the carburetor and thereby render or leave the carburetor functionally ineffectual while the accelerator and the throttle are in their idling positions and while the gear shift lever of the transmission is in gear, and it will also be understood that by virtue of the structure illustrated and the means provided for the supply of the by-passed air to the engine an automatic operation is effected, when the speed of the engine decreases to a certain speed, there is an automatic shutting off at the supply of the by-passed air and an automatic supply of fuel and air so as to cause an automatic actuating of the motor power means for the performance of the usual power producing purposes. If desired, the accelerator may be depressed to actuate the carburetor throttle and cause the engine to perform the usual power producing purposes at any period during the coasting operation or it happens automatically without any consideration or action on the part of the driver, if the speed of the engine decreases to a certain speed as hereinbefore stated.

It will be seen from the foregoing that there is provided a means or method of supplying air to the combustion chamber of an internal combustion engine of an automobile or other motor vehicle at a time when the engine is turning over, so as to provide for the circulation of the products of combustion and air through the combustion chamber to the exhaust manifold and return to the combustion chamber.

What is claimed is:

1. In a coasting device, the combination with a motor driven vehicle having an internal combustion engine provided with an intake manifold and also having an ignition system and an accelerator and a carburetor provided with a throttle having operative connection with the accelerator, of a chamber having communication with the intake manifold and the engine between the latter and the carburetor, a plurality of valves in said chamber, a magnet in said chamber, an air intake tube having communication with said chamber, means including a part having operative connection with said connection between the accelerator and carburetor throttle whereby to energize said magnet to move all but one of the valves from normal position, means whereby to lift the remaining valve in said chamber so as to permit the flow of air through said air intake tube and through said chamber to and through the intake manifold to the combustion chamber of the engine, said magnet, while energized, assisting said lifting means to hold said last mentioned valve off of its seat during said passage of the air, and means whereby to render the ignition system inoperative when the first mentioned valves are moved from normal position and thereby provide for the passage of the air through the combustion chamber and permit coasting of the vehicle.

2. In a coasting device, the combination with a motor driven vehicle having an internal combustion engine provided with an intake manifold and also having an ignition system and an accelerator and a carburetor provided with a throttle having operative connection with the accelerator, of a valved chamber having communication with the engine through the intake manifold, an air intake tube having communication with said chamber, means including a part having operative connection with said connection between the accelerator and carburetor throttle whereby to actuate the valve mechanism of said valved chamber to permit the passage of air from said air intake tube through the valve chamber and to and through the intake manifold to the combustion chamber of the engine, and means including an element located in the valved chamber and functionally associated with a movable element of said valve mechanism and constructed so as to render the ignition system of the engine inoperative when said valve mechanism is actuated as aforesaid and thereby provide for the said passage of air simultaneously with a coasting of the vehicle, said valve operating means being automatically operative at a predetermined condition to shut off said air circulation and restore the ignition system of the engine to operative condition to permit the motor power producing mechanism to function in the usual manner.

3. In a coasting device, the combination with an automobile having an internal combustion engine provided with a transmission mechanism including a gear shift lever, an intake manifold and also having an ignition system and an accelerator and a carburetor provided with a throttle having operative connection with the accelerator, of a valved chamber having communication with the engine through the intake manifold, an air intake tube having communication with said chamber, means to automatically actuate the valve mechanism of said valved chamber to permit the passage of air from said intake tube through the valved chamber to and through the intake manifold to the combustion chamber of the engine, and means controlled by and according to the position of a movable element of the valve mechanism and functioning in a manner to render the ignition system of the engine inoperative while the accelerator and the carburetor throttle are in their idling positions and while the gear shifting lever is in gear.

4. In a coasting device, the combination with an automobile having an internal combustion engine provided with a transmission mechanism including a gear shift lever, an intake manifold and also having an ignition system and an accelerator and a carburetor provided with a throttle having operative connection with the accelerator, of a valve chamber having communication with the engine through the intake manifold, an air intake tube having communication with said chamber, means to automatically actuate the valve mechanism of said valved chamber to permit the passage of air from said intake tube through the valve chamber and to and through the intake manifold to the combustion chamber of the engine, and means associated with a movable element of the valve mechanism and operatively controlled by and according to the position of the movable element and constructed and arranged so as to render the ignition system of the engine inoperative while the accelerator and carburetor throttle are in their idling positions and while the gear shifting lever is in gear, said valve operating means being automatically operable at a predetermined condition to shut off said air circulation and to restore the ignition system of the engine to operative condition to permit the power producing mechanism to function in the usual manner.

5. In combination with an internal combustion engine having an ignition system and also having a carburetor communicating with the intake manifold, of a chamber having communication with the intake manifold between the latter and the carburetor, a series of valves in said chamber, an electrically controlled magnet in said chamber, means whereby to energize said magnet to move all but one of said valves from their normal positions, means whereby the remaining valve in the chamber moves to open position when the other valves are moved as aforesaid, said magnet, when energized, holding the first mentioned valves out of their normal positions and assisting in holding said remaining valve away from its seat, means to render the ignition system of the engine inoperative upon said movement of the said first mentioned valves, and a valved air intake tube to supply air to said chamber and to the engine through said manifold intake when said valves are held out of their normal positions, as aforesaid, all of said valves moving to their normal positions when the magnet is de-energized, said energizing means operating automatically to de-energize said magnet.

6. The combination with a motor vehicle having an internal combustion engine provided with a combustion chamber and an intake manifold and also having an ignition system and an accelerator and a carburetor provided with a throttle having operative connection with the accelerator and a transmission mechanism including a gear shifting lever, of means operatively associated with said accelerator and said gear shifting lever and constructed and arranged so as to communicate with the intake manifold between the combustion chamber and the carburetor whereby to automatically supply air devoid of fuel to the combustion chamber of the engine and so as to substantially simultaneously render the ignition system inoperative while the accelerator and the carburetor throttle are in their idling positions and while the gear shifting lever is in gear.

7. The combination with a motor driven vehicle having an internal combustion engine provided with an intake manifold, an exhaust manifold and an ignition system and a carburetor provided with a throttle together with an accelerator operatively connected with said throttle, a transmission mechanism operatively connected with the engine, of an air intake tube, a chamber, valves operable in said chamber, said chamber communicating with said air intake tube and with said intake manifold, said air intake tube having communication with the exhaust manifold, spaced, interconnected valves in said air intake tube, means operable to position the valves of said tube to permit atmospheric air or warm air from the exhaust manifold to pass into said tube and therefrom to said chamber according to the position of one valve of the tube with relation to the other valve of the tube, and means for controlling the ignition system according to whether atmospheric air or exhaust gases are supplied to the engine, and means for automatically controlling the valves in said chamber for coasting purposes or for the production of power, alternately.

8. In a coasting device of the character described the combination with an automobile having an internal combustion engine provided with an intake manifold and having an ignition system and also an accelerator and a carburetor provided with a throttle having operative connection with the accelerator, of a valve controlled chamber leading to the intake manifold at the delivery side of the carburetor, an electrically controlled valve for said chamber and which valve when open allows a flow of atmospheric air or other gaseous medium as hot products of combustion through said chamber in a manner to by-pass the carburetor and thereby render the latter functionally ineffective, an electrical control system including a battery and a generator and its cut-out and an automatic switch operating in unison with the generator cutout, and means for electrically controlling the position of said valve, the several parts referred to herein being arranged so that when the accelerator and carburetor throttle are in their idling positions for coasting purposes said valve is positioned so that there is supplied to the intake manifold of the engine only a current of atmospheric air or warm gaseous medium that by-passes the carburetor to the combustion chamber so as to optionally cool the engine parts or supply warm gaseous medium to the engine parts when the vehicle is coasting under its own momentum and so that the ignition system is automatically rendered inoperative during any period when the accelerator and carburetor are in idling positions and the engine speed is at or above a determined speed.

9. In a coasting device of the character described, the combination with an automobile having an internal combustion engine provided with an intake manifold and having an ignition system and also an accelerator and a carburetor provided with a throttle having operative connection with the accelerator, of an electrical control system including a battery and a generator and its cutout and an automatic switch operating in unison with the generator cutout whereby when the accelerator and carburetor throttle are in their idling position for coasting purposes a current of air, devoid of fuel from the carburetor, is supplied optionally to the engine during the coasting period to the intake manifold of the engine and at a place located between the engine and the carburetor and whereby substantially simultaneously with the initiating of each coasting period the ignition system is automatically and positively rendered inoperative thus permitting coasting of the vehicle until the speed of the engine has become decreased to the extent that the generator will not charge the battery at such low speed but instead will be accompanied with a disrupting or opening of the electrical circuit thus automatically causing a shutting off of the supply of air devoid of fuel and permitting a supply from the carburetor of a combustible mixture thus causing the power producing mechanism to function in the usual manner.

10. In a coasting device of the character described, the combination with an automobile having an internal combustion engine provided with a transmission mechanism including a gear shift lever and the engine also having an intake manifold and an ignition system and also an accelerator and a carburetor provided with a throttle having operative connection with the accelerator, of an electrical control system including a battery and a generator and its cutout and an automatic switch operating in unison with the generator cutout so that when the accelerator and carburetor throttle are in their idling position for coasting purposes and with the gear shift lever in gear there is supplied a current of air only to the intake manifold of the engine at a location on the delivery side of the carburetor and so that the ignition system is substantially simultaneously rendered inoperative each time the throttle is placed in idling position thus permitting coasting of the vehicle without operating the ignition system and without any substantial supply of fuel air mixture from the carburetor to the engine until the speed of the engine has become decreased to the extent that the generator will not charge the battery at low speeds and thus effecting a de-energizing of the electrical circuit and the automatic shutting off of the supply of air alone and the automatic restoring of conditions according to which a fuel-air mixture is supplied from the carburetor to the engine whereby the latter can function with the accelerator and carburetor throttle still in their idling positions.

11. In a coasting device the combination with an automobile having an internal combustion engine provided with an intake manifold and also having an ignition system, an accelerator and a carburetor provided with a throttle having operative connection with the accelerator, of a by-pass chamber having connection with the engine through the intake manifold at a point on the delivery side of the carburetor throttle, a valve mechanism associated with the by-pass chamber for determining or controlling the flow of air through said by-pass chamber according to air suction or reduced pressure conditions within the intake manifold and for allowing the flow of air through said by-pass chamber upon the pressure within the air intake manifold becoming sufficiently reduced, which by-pass chamber has an air inlet therefor arranged whereby air can be supplied to and through said by-pass chamber past the valve thereof and so that the air thus supplied by-passes the carburetor and thereby renders the carburetor functionally inoperative when said by-passed air is thus supplied to and through said by-pass chamber, valve controlling means associated with said accelerator and the valve, which valve controlling means is arranged so that when said accelerator is in idling position for the carburetor the valve mechanism is positioned for permitting flow of air directly through the by-pass chamber into the intake manifold in by-pass of the carburetor provided the engine is operating at sufficient speed to create air suction or reduced pressure conditions within the intake manifold sufficiently to cause said valve mechanism to position itself to allow the flow of air into and through the by-pass chamber, and means associated with the valve controlling means and the ignition system for the engine for automatically rendering the ignition system functionally inoperative each time air is flowing past said valve through the by-pass chamber provided the engine is running at sufficient speed to create air suction or reduced air pressure conditions sufficiently low to cause said valve mechanism to thus function, said coasting device having means associated with the valve controlling means and thereby with the ignition system so that when the engine speed drops below said sufficient speed the valve controlling means functions to cut off the flow of air into and through the by-pass chamber and also functions to cause a reestablishment of the functional operativeness of the ignition system.

12. In a coasting device the combination with an automobile having an internal combustion engine provided with a transmission mechanism including a gear shifting lever and also having an intake manifold and an ignition system, an accelerator and a carburetor provided with a throttle having operative connection with the accelerator, of a by-pass chamber having communication with the engine through the intake manifold at a point on the delivery side of the carburetor, valve mechanism associated with the by-pass chamber for determining or controlling the flow of air devoid of fuel through said chamber with the gear shifting lever in gear, said by-pass chamber having an inlet arranged whereby gaseous medium can be supplied to and through said valve chamber past the valve mechanism thereto so as to by-pass the carburetor and thereby render the carburetor functionally inoperative, valve mechanism controlling means associated with said accelerator and the valve mechanism, which valve mechanism controlling means is arranged so that when the accelerator is in idling position for the carburetor the valve mechanism is positioned for permitting flow of air directly through the valve chamber into the intake manifold in by-pass of the carburetor provided the engine is operating at sufficient speed, means arranged and associated with the engine whereby when the engine speed falls sufficiently low the valve mechanism is caused to be positioned so as to shut off the by-passed air whereby the carburetor can forthwith proceed to function, and means associated with the valve mechanism and the ignition system for automatically rendering the ignition system functionally inoperative during the time that air is flowing through the by-pass chamber and past the valve mechanism thereof and for automatically rendering the ignition system functionally operative when the air flow into and through the by-pass chamber in by-pass of the carburetor is shut off.

13. The combination with an automobile having an internal combustion engine provided with an intake manifold and also having an ignition system and an accelerator and a transmission operatively coupled with the driving means of the vehicle and including a gear shifting lever, said internal combustion engine also having a carburetor provided with a throttle having operative connection with said accelerator, of means operable to cause a supply of air in by-pass of or independent of the carburetor to the combustion chamber of the engine when the accelerator and the throttle are in their idling positions and the gear shifting lever is in gear, said air supplying means being operatively associated with the engine in such a manner that when the speed of the engine decreases to a certain speed the by-passing of air past the carburetor ceases and conditions are re-established whereby the engine can be caused to function to produce power because of a supply of fuel-air mixture thereto through and from the carburetor.

14. The combination with a motor vehicle having an accelerator and an internal combustion engine and a transmission mechanism operatively connected with the driving means of the vehicle and including a gear shifting lever, the engine also having a combustion chamber and a manifold intake, and a carburetor provided with a throttle having operative connection with the accelerator, of electrically controlled means operatively connected to the intake for causing the supply of air devoid of fuel to the combustion chamber of the engine and for eliminating the functioning effect of the carburetor while the accelerator and the throttle are in their idling position and while the gear shifting lever is in gear and thereby permitting coasting of the vehicle and a supply of the air devoid of fuel to the combustion chamber as the vehicle coasts, said electrically controlled means being included in an electric circuit which has a switch that is closed by placement of the accelerator and throttle into idling positions therefor and a second switch that is closed by placement of the gear shift lever in certain of its power transmission positions.

15. An automobile power plant that includes an internal combustion engine having a transmission mechanism including a gear shifting lever, an intake manifold, a carburetor having a throttle valve which carburetor is connected for supplying fuel and air mixture through the intake manifold to the engine cylinders, an accelerator operatively associated with the throttle valve of the carburetor, an ignition system comprising a suitable source of electrical energy and wiring whereby the several operative parts of the ignition system are electrically connected in operative association, and in combination with the foregoing a by-pass chamber casing having an air intake leading thereinto and an outlet leading therefrom to the intake manifold at the delivery side of the carburetor, a valve arranged so that when open provision is made for passing of air devoid of fuel through the by-pass chamber past said valve in a manner whereby the carburetor is by-passed so that there is a consequent cessation of flow of fuel from the carburetor into the intake manifold, and which valve is arranged so that when closed it prevents a passing of by-passed air through the by-pass chamber whereby there is permitted a passing of fuel-air mixture from the carburetor into the intake manifold, electrical means whereby the position of said valve is controlled, said electrical means being comprised in a valve controlling circuit and being arranged so that when said circuit is closed said valve is open and so that when said circuit is open said valve is closed, said valve controlling circuit having an accelerator controlled switch that is closed when the accelerator is in idling position and the gear shifting lever is in gear, and an auxiliary speed control switch which is closed when the speed of the operating member controlling the position of said auxiliary switch is sufficiently high but which opens to disrupt the circuit when the speed of the operating member that controls the position of said auxiliary switch sufficiently drops, and means operatively associated with said valve for automatically rendering the ignition system inoperative when the valve controlling circuit closes and according to the position of said valve, which said means is also operatively arranged for automatically rendering the ignition system operative when the valve controlling circuit opens.

16. An automobile power plant that includes an internal combustion engine having an intake manifold, a carburetor having a throttle valve, which carburetor is connected for supplying fuel and air mixture to and through the intake manifold to the engine cylinders, an accelerator operatively associated with the throttle valve of the carburetor, an ignition system comprising a suitable source of electrical energy and wiring whereby the several operative parts of the ignition system are electrically connected in operative association, and in combination with the foregoing a by-pass chamber casing having an air intake leading thereinto and an outlet leading therefrom to the intake manifold at the delivery side of the carburetor, a valve arranged so that when open it provides for the passing of air devoid of fuel through the by-pass chamber past said valve and in a manner to by-pass the carburetor and cause a consequent cessation of flow of fuel from the carburetor into the intake manifold, which valve is arranged so that when closed it prevents a passing of the air devoid of fuel through the by-pass chamber in a manner to by-pass the carburetor whereby there is thereby permitted a passing of fuel-air mixture from the carburetor to and through the intake manifold into the engine cylinders, electrical means whereby the positioning of said valve is controlled, said electrical means being comprised in a valve controlling circuit and being arranged so that when said circuit is closed said valve is open and so that when said circuit is open said valve is closed, said valve controlling circuit having an accelerator controlled switch that is closed when the accelerator is in idling position but which opens when the accelerator is moved from idling position, an auxiliary speed controlled switch which is closed when the speed of an operating member that controls the positioning of said auxiliary switch is sufficiently high but which opens to disrupt the circuit when the speed of the operating member that controls the position of said auxiliary switch sufficiently drops, and a transmission gear controlled switch which is closed when the transmission gear is in certain power transmitting positions but which is open when the transmission gear is in certain other power transmitting positions.

17. A construction and arrangement as defined in and by the last preceding claim according to which means is provided so that the ignition system is rendered ineffectual at the time when the valve is open for permitting a flow of air devoid of fuel through the by-pass chamber in a manner to render the carburetor functionally ineffective but which last mentioned means is moved so that the ignition system becomes effective when the valve moves to prevent the flow of the air devoid of fuel in a manner to by-pass the functioning effect of the carburetor.

18. In an automobile power plant that includes an internal combustion engine having an intake manifold and an exhaust manifold, a transmission gear for selectively transmitting power from the engine to the parts to be ultimately driven therefrom, a carburetor having a throttle valve through which a fuel and air mixture is supplied to and through the intake manifold to the engine cylinders, an accelerator operatively associated with the throttle valve of the carburetor from which engine cylinders exhaust gases are conducted through an exhaust manifold, an ignition system comprising a generator driven from the engine, a battery, and suitable electric wiring between the generator, battery and other operative parts of the ignition system, and in operative association with the foregoing a carburetor by-pass chamber structure having an air intake leading thereto from the atmosphere, an exhaust gas intake leading thereto from the exhaust manifold, and an outlet leading therefrom to the intake manifold and delivering into the latter at the delivery side of the carburetor whereby air devoid of fuel can flow through the by-pass chamber into and through the intake manifold in a manner to by-pass the carburetor, a valve for the air intake, a valve for the exhaust gas intake, a by-pass chamber valve arranged so as to permit when open a flow of air devoid of fuel through the by-pass chamber into the intake manifold so as to effect a consequent cessation of flow of fuel from the carburetor into the intake manifold, which by-pass chamber valve is arranged so as to prevent when closed flow of gaseous medium through the by-pass chamber to the intake manifold and so as to allow a passing of fuel-air mixture from the carburetor into the intake manifold, electrical means whereby the position of said by-pass chamber valve is controlled, said electrical means being comprised in a circuit and arranged so that when said circuit is closed said by-pass chamber valve is open and so that when said circuit is open said by-pass chamber valve is closed, said circuit having an accelerator controlled switch that is closed when the accelerator is in idling position, a generator controlled switch which is closed when the generator is driven at a battery charging speed but which opens to disrupt the circuit when the generator speed sufficiently drops, and a transmission gear controlled switch which is closed dependent upon the position of the transmission gear for power transmitting purposes.

19. The combination with an automobile having an internal combustion engine provided with an intake manifold and also having an ignition system and an accelerator and a transmission mechanism operatively coupled with the driving means of the vehicle and including a gear shift lever, said internal combustion engine also having a carburetor provided with a throttle having operative connection with said accelerator, of electrically controlled air by-pass means in an electric circuit having a switch cooperatively associated with the accelerator and the throttle lever and controlled as to opening and closing by the conjoint movement of said accelerator and throttle and also having a switch controlled as to opening and closing by the gear shift lever, which air by-pass means is operable to permit a supply of by-pass air to the combustion chamber of the engine when said circuit is closed because of the fact that the accelerator and the throttle are in their idling position and the gear shift lever is in gear whereby air devoid of fuel or a supply of gaseous medium for power purposes may be supplied to the engine, alternately.

20. The combination with a motor vehicle having an internal combustion engine provided with an intake manifold and also having an ignition system and an accelerator and a carburetor provided with a throttle having operative connection with the accelerator and a transmission mechanism including a gear shift lever, of electrically controlled air by-pass means in a circuit having a switch associated with the accelerator and carburetor throttle and a switch associated with the gear shift lever, which air by-pass means is constructed and arranged to automatically supply air to the combustion chamber of the engine at all times—provided the engine speed is sufficiently high—when the accelerator and carburetor throttle are in their idling positions and the gear shift lever is in high gear whereby air devoid of fuel or a supply of gaseous medium for power purposes may be supplied to the engine, alternately.

21. The combination with an automobile having an internal combustion engine provided with an intake manifold and also having an ignition system and an accelerator and a transmission mechanism operatively coupled with the driving means of the vehicle and including a gear shift lever, said internal combustion engine also having a carburetor provided with a throttle having operative connection with said accelerator, of electrically controlled means operable to permit the supply of air to the combustion chamber of the engine while the accelerator and throttle are in their idling positions and while the gear shift lever is in gear, said electrically controlled means being in a circuit having a switch that is closed by the positioning of the accelerator and throttle to idling position and a switch that is closed by the positioning of the gear shift lever to said power transmission position, said electrically controlled means being associated with the engine in such a way as to be operable at a predetermined time to shut off the said supply of air alone to the engine upon the engine speed dropping to a certain speed.

22. The combination with an automobile having an internal combustion engine provided with an intake manifold and also having an ignition system and an accelerator and a transmission mechanism operatively coupled with the driving means of the vehicle and including a gear shift lever, said internal combustion engine also having a carburetor connected with said accelerator, of means associated with the gear shifting lever and the accelerator and operable only upon the positioning of said accelerator to idling position and of said gear shifting lever to one of its power transmission positions to permit the supply of air alone to the combustion chamber of the engine and in by-pass of the fuel delivery section of the carburetor, and means including a tank and a pressure regulating means and operatively connected to the line of supply to the combustion chamber whereby there can be supplied a carbon disintegrating medium to the current of by-passed air alone, which carbon disintegrating medium is supplied under predetermined pressure and in predetermined quantities while the accelerator and carburetor throttle are in their idling position and while the gear shifting lever is in power transmitting position.

23. An automobile having an engine supplied through an intake manifold with an explosive mixture from a throttle controlled carburetor and characterized in that there is a coaster valve provided by a differential valve that is closed during normal power producing operations of the engine, a casing for said coaster valve, the large area of the differential valve being located within said casing, the casing being connected through a means of communication with the interior of the intake manifold for causing by partial vacuum the differential valve to be raised for coasting periods, whereby air can flow past a small area of the valve into the intake manifold, and an electrically operated magnet functioning with respect to said differential valve which has thus been opened to thereafter assist in holding open said differential valve during the coasting period.

24. An automobile having an engine supplied through an intake manifold with an explosive mixture from a throttle controlled carburetor and characterized in that there is a hollow cup shaped valve provided with differential diameters with its closed lower end normally seated during normal power producing operations of the engine, the larger diameter of which cup shaped valve is within a casing connected through a means of communication with the interior of the intake manifold for causing by partial vacuum the valve to be raised for coasting periods, whereby air can flow past the smaller diameter of the valve into the intake manifold, and an electrically operated magnet in said casing and projecting into said cup shaped valve and functioning with respect to the valve so that when the valve is unseated by partial vacuum the magnet will assist the partial vacuum to hold the valve open during the coasting period.

25. The combination with a motor vehicle having an internal combustion engine provided with an intake manifold and an exhaust manifold and an accelerator and a carburetor provided with a throttle having operative connection with the accelerator, of a valve mechanism including a chamber having communication with the intake manifold of the engine, means for operating said valve mechanism, an air intake tube having communication intermediate its ends with said valve chamber and at one end having communication with the exhaust manifold of the engine and at its opposite end having an air inlet, valves located in said air intake tube, one on each side of said communication of the air intake tube with said valve mechanism chamber, an operative connection between said air intake tube valves, means whereby to operate the valves of the air intake tube in unison so as to selectively open one valve and close the other valve to supply either atmospheric air to the engine when the vehicle is in motion or to supply warm air from the combustion chamber by way of the exhaust manifold to and through said valve mechanism back to the combustion chamber when the said valve is open to the engine while the vehicle is moving under its own momentum, and means for maintaining the carburetor throttle substantially closed during such supply of atmospheric or warm air to the engine.

26. The combination with a motor vehicle having an internal combustion engine including a plurality of chambers and provided with an intake manifold and an exhaust manifold and an accelerator and a carburetor provided with a throttle having operative connection with the accelerator, of means including an air intake tube and a communicating valved chamber having communication with the intake manifold of the engine and the air intake tube having communication with the exhaust manifold of the engine whereby to supply a continuous circulation of warm air through the intake manifold and combustion chambers of the engine and through the exhaust manifold and the air intake pipe when the vehicle moves under its own momentum, and means for supplying oxygen for admixture with the warm air to disintegrate carbon and effect separation and discharge of loosened particles of carbon at the juncture of connection of the air intake pipe with the exhaust manifold.

27. The combination with a motor vehicle having an internal combustion engine provided with an intake manifold and an exhaust manifold and an accelerator and a carburetor provided with a throttle having operative connection with the accelerator, of a valve chamber having communication with the intake manifold of the engine between the latter and the carburetor, a plurality of valves in said chamber, a magnet in said chamber, an air intake tube having communication intermediate its ends with said valve chamber, connected valves in said air intake tube, one on each side of said communication between the valve chamber and the air intake tube for alternate opening and closing movements, a by-pass leading from one of the valves of said valve chamber to and communicating with the intake manifold of the engine, one of the valves of said valve chamber providing for ingress of air into the valve chamber when unseated and being connected to the last mentioned valve for movement in unison therewith, means to energize said magnet and to move all but one of the valves of the valve chamber from seated position to open the air inlet of said chamber and to establish communication between the valve chamber and the inlet manifold by way of said by-pass, means whereby to unseat the remaining valve in said valve chamber so as to permit the flow of air through said air intake tube from either end thereof, according to which one of the air intake tube valves is open and to and through said valve chamber to and through the intake manifold to the combustion chamber of the engine, said magnet, when energized, assisting said valve unseating means to maintain said last mentioned valve off of its seat during said passage of the air.

28. In a coasting device, the combination with a motor driven vehicle having an internal combustion engine provided with an intake manifold and also having an ignition system and an accelerator and a carburetor provided with a throttle having operative connection with the accelerator, of a valved chamber having communication with the engine through the intake manifold, an air intake tube arranged adjacent the valved chamber and having communication with the latter, an electric circuit including a switch device supported on the air intake tube and having operative connection with said connection between the accelerator and carburetor throttle whereby upon operation of said connection in one direction the switch closes the circuit so as to actuate the valve mechanism of said valved chamber to permit the passage of air from said air intake tube through the valved chamber and to and through the intake manifold to the combustion chamber of the engine, and means including an element located within said valve chamber engageable by a movable element of said valve mechanism and constructed so as to render the ignition system of the engine inoperative when said valve mechanism is actuated as aforesaid and thereby provide for the said passage of air simultaneously with a coasting of the vehicle, said valve operating means being automatically operative at a predetermined condition to open said switch to operate said valve mechanism to shut off said air circulation and restore the ignition system of the engine to operative condition to permit the motor power producing mechanism to function in the usual manner.

29. In a coasting device, the combination with a motor vehicle having an internal combustion engine provided with a combustion chamber, an intake manifold and an accelerator and a carburetor provided with a throttle having operative connection with the accelerator, of an electrically operated valve mechanism including a casing and upper valves coupled together and a normally closed lower valve located therein and a magnet arranged between said upper valves and the said lower valve, said casing having an air inlet and said lower valve controlling supply of air to said casing and the casing having communication with the intake manifold between the combustion chamber and the carburetor, an electric circuit in which said valve mechanism is located, and means whereby to close said circuit and energize said magnet to operate said upper valves and by partial vacuum to cause said lower valve to be raised for coasting purposes, said magnet assisting said partial vacuum to hold said lower valve off of its seat when same is unseated by said partial vacuum to thereby permit passage of a volume of air devoid of combustible mixture to and through said casing to and through the intake manifold to the combustion chamber in by-passed relation to the carburetor, said circuit closing means subsequently operating to de-energize said magnet and restore said valves to their normal positions to thereby cut off said supply of air and restore the vehicle motive power parts to normal condition for motor power purposes.

30. In a coasting device, the combination with a motor vehicle having an internal combustion engine provided with a combustion chamber, an intake manifold and an accelerator and a carburetor provided with a throttle having operative connection with the accelerator, of an electrically operated valve mechanism including a casing and valves at opposite ends of the casing and a magnet arranged between the valves at the opposite ends of the casing, said casing having an inlet and the valve at one end of said casing being adapted to control the supply of air to said casing and the casing having communication with the intake manifold between the combustion chamber and the carburetor, an electric circuit in which said valve mechanism and magnet are located, a by-pass between the valve casing and the communication between the casing and the intake manifold, and means whereby to close said circuit and energize said magnet to operate the valves at one end of the casing and by partial vacuum cause the valve at the other end of the casing to be raised for coasting periods, said magnet assisting in holding said last mentioned valve off of its seat when same has been unseated by said partial vacuum so as to permit passage of a volume of air past said last mentioned valve, devoid of combustible mixture, to and through said valve casing to and through the intake manifold to the combustion chamber in by-passed relation to the carburetor, said circuit closing means subsequently operating to deenergize said magnet and restore said valves to their normal positions to thereby cut off said supply of air and restore the vehicle motive power parts to normal conditions for motor power purposes.

31. In a coasting device, the combination with a motor vehicle having an internal combustion engine provided with a combustion chamber, an intake manifold and an accelerator and a carburetor provided with a throttle having operative connection with the accelerator, of an electrically operated valve mechanism including a casing and a normally open valve at one end of the casing and a normally closed valve at the other end of the casing and a magnet arranged within the casing between said valves and normally spaced from said normally closed valve, said casing having an air inlet which is normally closed by said normally closed valve and the casing having communication with the intake manifold between the combustion chamber and the carburetor, an electric circuit in which said valve mechanism and magnet are located, and means whereby to close said circuit and energize said magnet to operate said normally closed valve and maintain the latter open so as to thereby permit passage of a volume of air devoid of combustible mixture to and through said valve casing to and through the intake manifold to the combustion chamber in by-passed relation to the carburetor, and at such time of passage of the volume of air rendering the carburetor ineffective for the supply of combustible mixture to the combustion chamber, said circuit closing means subsequently operating to de-energize said magnet and restore said valves to their normal positions to thereby cut off said supply of air and restore the carburetor to functional condition for supplying combustible material to the combustion chamber.

GEORGE H. TABER.